April 19, 1966   R. WAROUX   3,246,588
PANORAMIC PHOTOGRAPHY
Original Filed Jan. 7, 1960   7 Sheets-Sheet 1

INVENTOR:
Raoul Waroux
BY Homer R. Montague
ATTORNEY

April 19, 1966  R. WAROUX  3,246,588
PANORAMIC PHOTOGRAPHY
Original Filed Jan. 7, 1960  7 Sheets-Sheet 2

INVENTOR:
Raoul Waroux
BY
ATT'Y.

INVENTOR:
Raoul Waroux
BY Homer R. Montague
ATTORNEY

April 19, 1966 R. WAROUX 3,246,588
PANORAMIC PHOTOGRAPHY
Original Filed Jan. 7, 1960 7 Sheets-Sheet 4

FIG. 8

INVENTOR:
Raoul Waroux
BY
Homer R. Montague
ATTY.

INVENTOR:
Raoul Waroux
BY *Homer R. Montague*
ATTY.

April 19, 1966 R. WAROUX 3,246,588
PANORAMIC PHOTOGRAPHY
Original Filed Jan. 7, 1960 7 Sheets-Sheet 6

INVENTOR:
Raoul Waroux

BY Homer R. Montague
ATTORNEY

April 19, 1966 R. WAROUX 3,246,588
PANORAMIC PHOTOGRAPHY
Original Filed Jan. 7, 1960 7 Sheets-Sheet 7

INVENTOR.
*Raoul Waroux*
BY
*Homer R. Montague*
ATTY.

United States Patent Office 3,246,588
Patented Apr. 19, 1966

3,246,588
PANORAMIC PHOTOGRAPHY
Raoul Waroux, Paris, France, assignor, by mesne assignments, to Inventions Finance Corporation, a corporation of Delaware
Original application Jan. 7, 1960, Ser. No. 1,105, now Patent No. 3,142,237, dated July 28, 1964. Divided and this application July 16, 1964, Ser. No. 392,364
8 Claims. (Cl. 95—18)

This is a division of application Serial No. 1,105 filed January 7, 1960, now Patent No. 3,142,237. This invention pertains to photography, and especially to novel and improved arrangements for the making of panoramic or so-called "circuit" photographs which show an image corresponding to 360 degrees, or any lesser angular portion, of the view which extends angularly about a fixed viewpoint which is on the axis of rotation of the taking apparatus; the apparatus working in a continuous manner which is however variably controlled as a function of the scene illumination. The invention further comprehends an extension of its principles to such an apparatus for the making of stereo pairs of such views, and to various novel structural features to those ends.

Panoramic cameras are not broadly new, and in prior years considerable development and use of such cameras was undertaken, through mostly for the purpose of photographing large groups of people. Little attention was paid to the use of such equipment by amateurs or even by professional photographers for scenic or art photography. Among the reasons for this desuetude are undoubtedly the fact that such equipments as then known were of heavy and cumbersome construction, requiring considerable skill in their operation, needing special and expensive films, and capable of producing pictures only of very inferior photographic quality.

It is accordingly a main object of the present invention to provide a design of panoramic camera of relatively small, wieldy and compact construction, which will use standard commercially available films, and which will operate in a simple and reliable manner to make pictures of superior quality, comparable in all respects to those presently produced with amateur cameras of moderate price.

A further important object of the invention is to provide a camera of the foregoing type, in which provision is made for the fully automatic adjustment and control of the exposure level, during each circuit or exposure, to allow for the fact that the scene illumination in practically all subjects, especially those illuminated by natural light, varies significantly in accordance with direction, as well as in accordance with the prevailing general level of illumination.

Still another object of the invention is to provide apparatus of the kind mentioned, in which the irregularities of motion necessarily inherent in toothed gears and other such motion transmissions, are completely eliminated; whereby the pictures produced will be free from the streaks and stripes which inevitably result from the slightest jerkiness in the camera or film motion.

Briefly, the above and other objects of the invention are attained by a construction in which the camera is rotated about an axis which passes through the center of a fixed drum within the camera casing, so that film supplied from one reel is drawn, by a continuous wrapping process, across a narrow slit aperture very close to the focal plane of the taking lens, and thence taken up upon a storage reel. Provisions are made for the prevention of diffraction effects at the slit aperture, as well as the eliminations of any multiple-reflection images on the film, and for the pre-setting of a suitable variation range in the exposure levels in the various taking directions; the latter function is achieved by varying the speed with which film is passed across the slit, or in the alternative by varying the actual diaphragm opening progressively during the circuit, in accordance with the available light.

The invention will be described herein in connection with certain preferred embodiments, and alternative constructions thereof, to the end that the invention may readily be practiced by those skilled in the art; but it will be understood that such details are given by way of instruction and not of limitation. The description will best be understood by reading the same in connection with the appended drawings, forming a part hereof, and in which:

Figure 1:
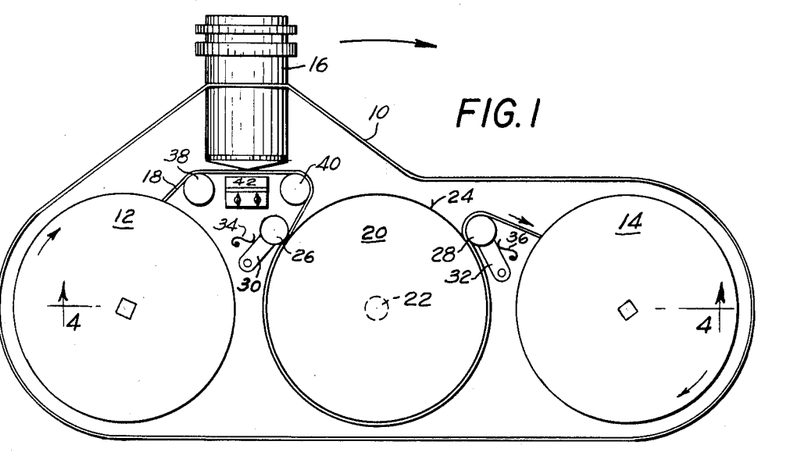
FIGURE 1 is a plan view, largely in horizontal section, illustrating one preferred form of the panoramic camera of the invention.

Referring first to FIGURE 1 of the drawings, the panoramic camera is shown as housed within a casing 10 containing a film supply reel 12 and a film take-up reel 14 disposed at opposite ends of the casing. The reels should be of sufficient size as to accomodate a film length adequate for a plurality of exposures; using film of standard 35 mm. width, and a taking lens having a focal length of 45 mm. a single 360 degree exposure will require 28.26 mm. of film length. Thirty meters of such film can readily be loaded into such a camera without exceeding practical and convenient size limitations. For reasons connected with the film feeding construction, the picture length for one complete circuit of 360 degrees will always be 2 pi times the focal length of the taking lens.

The fixed-focus lens of the camera is indicated at numeral 16 in FIGURE 1, and the film itself at numeral 18. The exposure principle employed is that of moving the film steadily across an exposure slit which is transverse to the direction of film motion, said slit lying precisely in the focal plane of the taking lens. By making the speed of motion of the film exactly proportional to the angular speed with which the camera and lens is swung in azimuth (in the case of a horizontal circuit) the slit image instantaneously transmitted to the film from the lens will always be stationary on the film. That is, both will be moving at the same speed so that no relative motion results. This principle is not in itself novel, but has heretofore always been accomplished by the use of reducing gears and the like complicated mechanisms. In the present invention, a direct film feeding system is employed, according to which the camera itself is caused to swing in azimuth as by a motor, and this motion of the camera directly (and hence always proportionally) effects the film feeding.

To accomplish the proper film feed without respect to the amounts of film already paid off of or onto the film reels, feeding is accomplished by a wrapping process involving a stationary drum about whose central axis the panoramic scanning motion of the camera is effected. Thus, in viewing FIGURE 1, it will be necessary to understand that the feeding drum 20 remains fixed during the rotation of the rest of the camera casing 10, the drum being secured to the tripod or other camera support in a way to be described. As the remainder of the camera rotates about the central shaft 22 of drum 20, the film 18 is wrapped about the drum periphery from supply reel 12 (passing across the exposure slit in so doing) and is unwrapped off of drum 20 and passed to the take-up reel 14.

The film is prevented from slipping on the periphery of drum 20 by reason of a rubber or similar frictional coating or layer upon the drum, as indicated at numeral 24. Good contact is further ensured by the pressure rollers 26 and 28 at the respective wrap-on and wrap-off points, these being pivotally mounted as on arms 30, 32 urged towards the drum by respective pressure springs 34 and 36. The take-up reel 14 is slightly over-driven by a freely slipping drive belt as well known in other types of cameras, and the supply reel 12 is lightly braked to maintain the film taut against slack and to prevent it from spilling during transportation of the apparatus. Provisions for both of these functions will be detailed below.

Taking lens 16 is positioned so that its focal plane lies precisely in the plane of film 18 as it passes from supply reel 12 to the drum 20. To this end, the film passes over two idler rollers 38 and 40 just rearward of the rear extremity of the lens barrel (which contains the slit-defining parts to be described hereinafter), and these guide the film across a pressure pad 42. Thus, as the camera rotates clockwise in FIGURE 1, and bearing in mind that drum 20 remains stationary and that film 18 cannot slide thereon, the film is necessarily drawn from supply reel 12, across the exposure slit, and about the drum periphery by the wrapping process described; while at the same time, film unwrapping from drum 20 across roller 28 is taken up by the over-driven take-up reel 14. It follows that the rate of motion of the film across the exposure slit is directly proportional to the speed with which the camera is rotated as a whole, and the instantaneous image is always stationary on the element of film being then exposed; this regardless of any variations in the speed of rotation of the camera. Such variations affect only the duration of exposure of each small strip area of the film, and in one form of the invention this exposure variation is turned to useful account in a manner to be detailed below.

Figure 2:
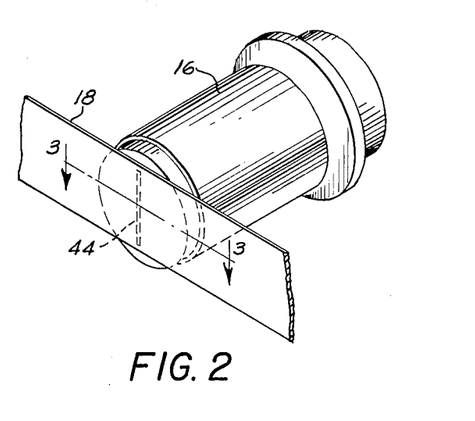
FIGURE 2 is a fragmentary perspective view of the relation between the taking lens and its exposure aperture slit, and the moving film strip.
Figure 3:
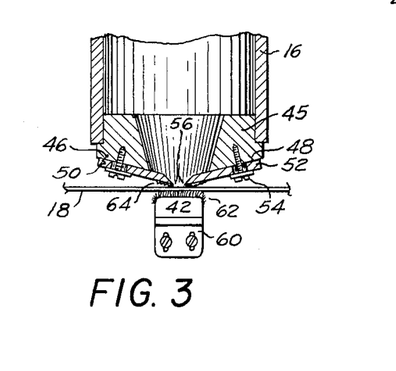
FIGURE 3 is a sectional view of a portion of the structure of FIGURE 2, taken along line 3—3 thereof.

FIGURE 2 of the drawings shows the direct relation of the lens and film strip. The lens 16 is again shown as mounted in a conventional barrel, the rear end containing the slit-defining parts which expose only a narrow strip area corresponding to the slit aperture 44, transverse to the narrow dimension of film 18. FIGURE 3 shows these parts in horizontal section, including the rear lens barrel fitting 45 having the inclined rear faces 46 and 48 to which are secured the slit-defining blades 50 and 52. The latter are fastened by screws such as 54 engaged in enlarged slots in the blades to enable very precise positioning of the blades with their internally-beveled slit-defining margins in closely spaced and accurately parallel positions. For a camera of the type described herein, a slit width of from ⅕ to ½ of a millimeter must be maintained for pictures of good clarity.

It is also necessary that the beveled ends of the blades 50 and 52 have their sharp edges 56 in contact with the moving film; these "sharp" edges may thus advantageously be rounded to a radius of perhaps 1/50 of a millimeter to avoid any abrasion of the film surface. To maintain a firm but harmless contact, the pressure pad 42 of sponge rubber or the like is secured as upon a fixed bracket 60 just behind the slit aperture, and may be faced with velvet as at 62. These precautions aimed at maintaining contact between the slit edges and the film are required for several reasons. Thus, any separation at these points would permit diffusion of light laterally beneath the blades onto the film, increasing the effective slit width and permitting multiple reflection exposures, since the film has a finite reflecting power. Also, the separation would permit diffraction of rays passing the relatively sharp edges defining the slit edges, with consequent additional defocussing of the line images at these locations.

It is desirable, for prevention of the lodging of dust particles at the exposure slit, to provide the undersides of the blades 50 and 52 with a coating of pile fabric or the like, as at 64, to physically trap such dust; such material does not, of course, extend clear up to the slit margins. The inner surfaces of the lens barrel, fitting 45 and blades 50 and 52 will preferably be painted a dull light-absorbing black, to avoid reflected rays, loss of contrast and light ghosts in the image.

Figures 4, 5:
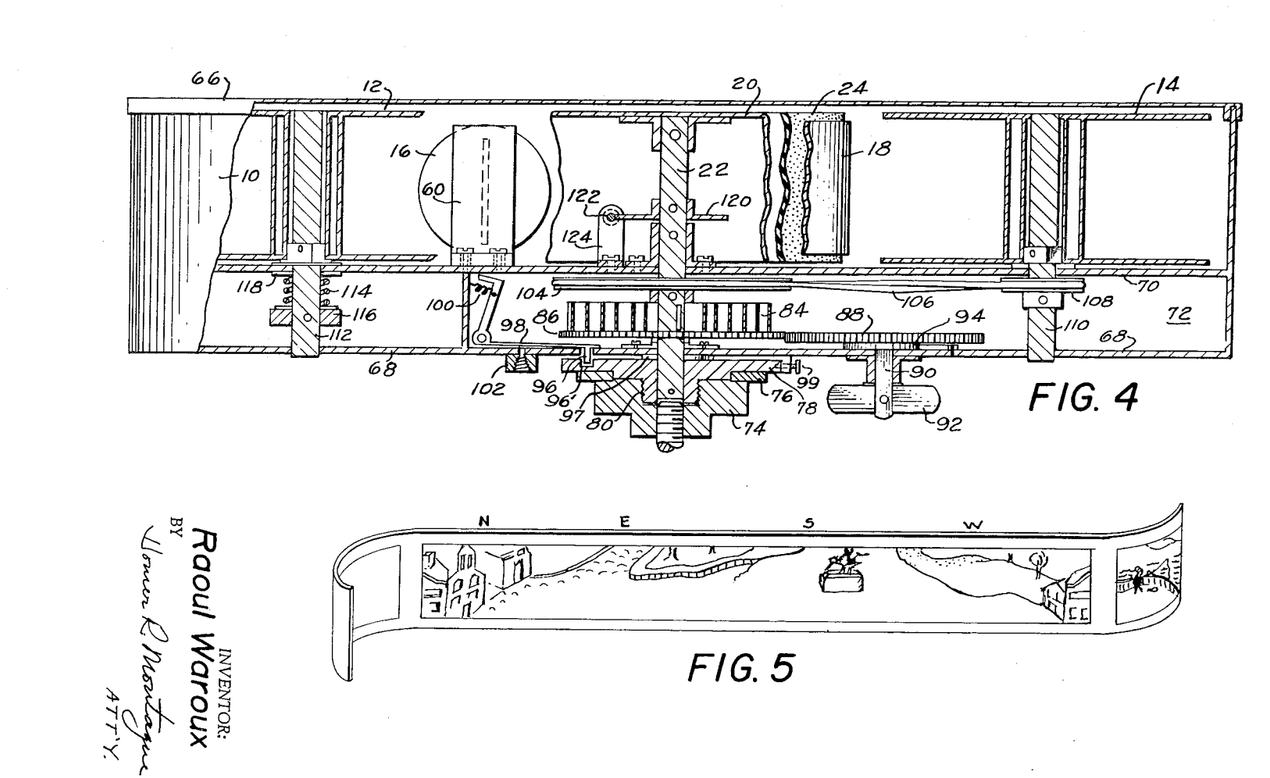
FIGURE 4 is a vertical sectional view, on line 4—4 of FIGURE 1, with parts broken away, of the same camera as shown in FIGURE 1, but to a somewhat larger scale.
FIGURE 5 is a view in elevation of a typical developed film strip, exposed with a panoramic image in accordance with the invention.

With the above general arrangements in mind, certain details of the camera will now better be understood by referring to FIGURE 4 of the drawings, which shows the principal parts largely in vertical section looking in the direction of arrows 4—4 of FIGURE 1. Parts already described bear the same reference numerals; thus, the casing is designated by numeral 10 but is here shown as having a removable top closure 66 to keep the camera light tight, and the casing also has a bottom closure plate 68 and a false bottom 70 which acts also to define a mechanism chamber 72. Numeral 74 designates a fixed support for the camera, being for example fastened to the head of a tripod of usual form. The lower end of the central shaft 22 of drum 20 is fixed in a clamp plate 78, and an exposure-controlling cam 76 (to be described) is fixed between the support 74 and clamp plate 78 which is threaded into a socket in the support 74 as at 80. The entire camera casing 20 is freely rotatable about the shaft 22.

Rotation of the housing 20 is accomplished in response to the tension of a spiral spring 84 having its inner end secured to shaft 22 and its outer end affixed to the gear wheel 86 rotatable on shaft 22 and meshed with a winding gear 88 journalled in the bottom plate 68 by a shaft 90, to which a winding key 92 is connected. A ratchet and pawl indicated at 94 serve to prevent reverse rotation of the winding gear 88, and rotation of the camera casing about shaft 22 is prevented by engagement of a stop pin 96 (on a release lever 98) in a recess 96' of clamp plate 78. The stop can be released by the lifting of lever 98 against its biasing spring 100 as by a Bowden cable inserted in fitting 102 in a known manner, to initiate rotation of the casing 10; such rotation will then continue until the stop pin 96 engages a blocking arm 97 secured in adjusted position on clamp plate 78, as by screw 99. It will be understood that while, in the equivalent clockwise drive, the shaft 22 would be caused to rotate in casing 10, the fact that the shaft is held fixed in the present construction requires that the casing itself rotate, because of the reaction of the spring tension through gears 86 and 88 upon the winding shaft 90.

The apparent or relative rotation of shaft 22 within casing 20 is also imparted to a pulley 104 fixed to said shaft, and connected by a crossed spiral spring or similar belt 106 to a pulley 108 fast on the shaft 110 journalled in plates 68 and 70. The portion of this shaft extending above plate 70 is squared to receive in driving engagement the take-up reel 14, and the ratio of the pulley sizes is chosen to ensure adequate take-up of the film 18 as the camera is allowed to rotate. A spring-urged braking force is applied to the squared shaft 112 which carries supply reel 12, by mechanism of a kind well known of itself, including a helical spring 114 compressed between a collar 116 fixed on shaft 112 and a friction washer 118 engaging the plate 70.

Figures 6, 6A:
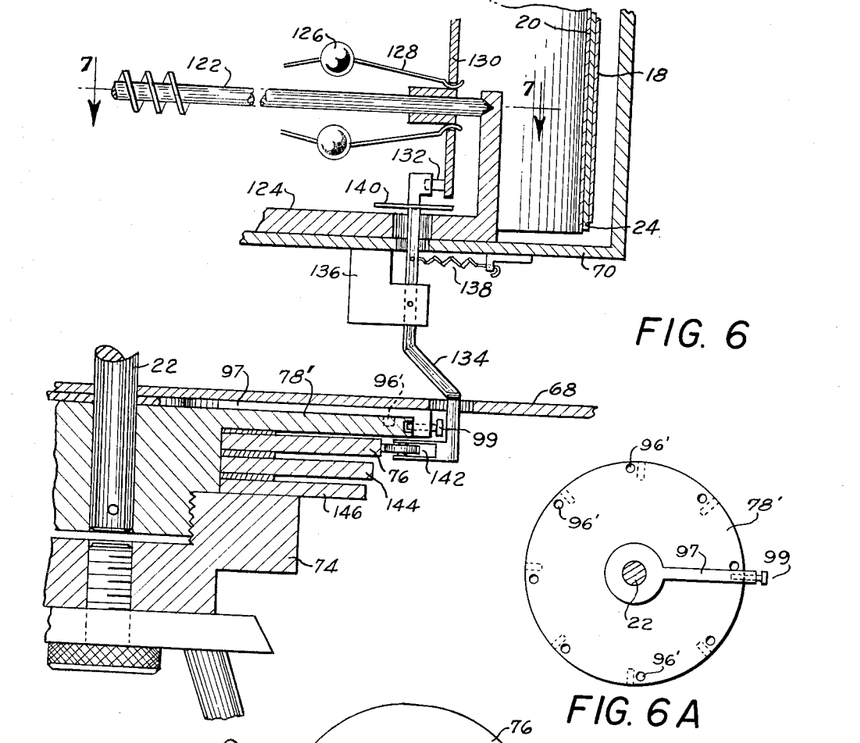
FIGURE 6 is an enlarged fragmentary view, in vertical section, of a portion of the FIGURE 1 structure, showing the speed control means and the way in which it is modified in its regulatory action during the progress of one exposure.

Regulation of the speed with which the motor spring 84 is allowed to rotate the camera is accomplished by a governor mechanism including a worm gear 120 connected to shaft 22 and meshing with a coarse-pitch worm shaft 122. In a manner familiar to those acquainted with dicated at 124 secured to the mechanism plate 70. The governor mechanism will be better understood by turning now to FIGURES 6 and 7 of the drawings, which show the essential parts related to this device in more detail and to a larger scale, and with an arrangement for multiple exposure-control cams.

The speed governor shaft 122 carries a pair of flyballs 126 secured to the usual springs 128, whose free ends floatingly engage a plate or disc 130 free to slide along 122. In a manner familiar to those acquainted with such governors, increasing speed of shaft 122 forces the flyballs to a path of greater radius, and this shortens the springs 128 in the axial direction, so that the disc 130 is caused to slide to the left in FIGURE 6. A brake shoe 132 of frictional material is disposed adjacent the face of the disc, as by being mounted upon a cranked pivot arm 134 journalled on a bracket 136. The normal position of the brake shoe 132 is defined by the tension of a spring 138, it being understood that the position of the brake shoe establishes the governed speed of shaft 122 for the reason that as disc 130 touches the shoe with more and more pressure, the disc is thereby slowed down, and therefore returns toward its former position corresponding to the desired speed of shaft 122. Crank arm 134 extends through a hole in governor frame 124 and plate 70, the same being light trapped as by a baffle 140 carried by the arm; beyond its pivot point, arm 134 extends also through a hole in plate 68, and carries at its lower bent end a follower wheel 142 urged against the cam plate (76) clamped between fixed support 74 and a fixed clamp plate 78' generally similar to plate 78 already described.

Thus, the governed speeds of shafts 122 and 22 are established by the position of crank arm 134 about its pivot, and this is established by the radius of cam plate 76, which is profiled to give a suitable exposure at the various azimuthal positions taken up by the camera during its circuit. The correst profile can easily be obtained experimentally, as against photometer or exposure-meter readings for a typical circuit scene for a few angles, with interpolation of the cam shape along a smooth curve therebetween. Since the factor of total general illumination can readily be established by an ordinary meter reading, and the diaphragm of lens 16 set accordingly, a single cam 76 will give the proper relative changes for a considerable variety of scenes. However, as particularly shown in FIGURES 6, a set of several cams including cams 144 and 146 may be carried between elements 74 and 78', the one selected being installed in the top position (as at 76) and the others remaining idle. It is also quite feasible to provide in effect a cam of variable profile, as by using in place of follower wheel 142 a much wider wheel able to span the edges of several cams superposed in the same way shown in FIGURE 6. Such a wide roller will then be governed as to position by that cam which momentarily presents the largest radius, and by manually varying the angular relationship as amongest several such cams, in setting up the camera, any desired profile can readily be realized.

FIGURE 5 of the drawings indicates the appearance of a typical complete panoramic photograph as produced in the camera described above, after having been developed and otherwise completely processed for viewing or projection. In this example, the directions in which the lens was pointed during different parts of the complete 360-degree exposure have been marked by the directional letters N, E, S and W, the exposure at each point having been automatically adjusted by means of the cam and speed control system described, so that a suitable film exposure resulted notwithstanding the considerable differences in illumination of the scene in those directions.

The purpose of adjustably positioned blocking arm 97 is to permit the making of pictures having a length less than that corresponding to nearly a full circle; for example, having lengths corresponding to 270 degrees, 180 degrees, or even intermediate values. Thus, as clearly shown in FIGURE 6A, the upper surface of clamp plate 78 actually contains a multiplicity of the holes or recesses 96', and the peripheral edge of this plate has a corresponding plurality of recesses to receive the screw 99 and thus enable blocking arm 97 to be positioned just beside any selected one of the holes 96'. To make a picture of full length, arm 97 will be positioned at the particular hole 96' engaged by pin 96, but for a shorter length picture, it will be positioned at a hole 96' for example, as shown in FIGURE 4, 180 degrees away from the pin 96. Then when the Bowden cable lifts pin 96 out of the starting hole, the camera will continue to rotate until pin 96 is struck by arm 97 a half turn later, stopping the exposure at the half-length position. When the Bowden cable is released after the camera stops, pin 96 will fall into the adjacent hole 96' and the camera thus locked. Larger and smaller angles of camera rotation, and corresponding picture lengths, are obtained by using the other positions of arm 97, in an entirely obvious manner.

While the description has been directed to one form in which it is the camera's rotational speed which is altered (by the cam configuration) to obtain the desired variation in film exposure level, it will be obvious that such a cam, or cams, can equally well be caused to vary the diaphragm opening, leaving the speed at a fixed and constant value. It is also feasible to employ a direct and continuous reading of the illumination value, as by known types of photoelectric exposure meters, and to use the output of such a device for the adjustment of the diaphragm opening from point to point, or even for the control of the camera speed; the latter procedure will eliminate the necessity for the cams and the mechanism controlled thereby. However, the form disclosed herein is preferable for good results at minimum cost. The variations just mentioned are illustrated structurally in connection with a second embodiment of the camera to be described below.

It is also easily conceivable that the periodic adjustment of the controlling position of crank lever 134 could be accomplished manually, in accordance with the judgement of the user or his interpretation of exposure meter readings made as usual in the respective directions. In the case of diaphragm control (as opposed to speed control), it will be simpler in most cases to employ a flexible control cable such as a Bowden cable to transmit the camming actions to the diaphragm location, most usually at the lens 16 and hence rather more remote from the cam position than is the spring drive motor in the form shown. In general, of course, control of the diaphragm will require a cam of different profile from that employed in the case of camera speed regulation.

In the foregoing description, and in the claims, the reference to the taking in different directions is not intended to limit the invention to panoramic views in the horizontal plane, as they can equally well be taken in a vertical plane (especially useful for tall buildings, monuments and the like) or even at intermediate inclinations. In such cases, the angular extent may if desired be limited to 180 degrees, 120 degrees, or what ever angle is required to cover the subject of interest, and the invention permits excellent results without the necessity of retiring to an inordinate distance, as is required with conventional cameras.

Stereoscopic embodiment

By adding to the mechanism a second taking lens, spaced from the first one, and providing suitable arrangements for preventing the overlapping of images, a novel stereoscopic panoramic camera is produced; that is, one which produces on the film a pair of panoramic pictures, suitable for viewing in an appropriate stereoscope or for projection, the pictures being related to the individual spaced viewpoints represented by the spacing of the taking lenses.

Figure 8:
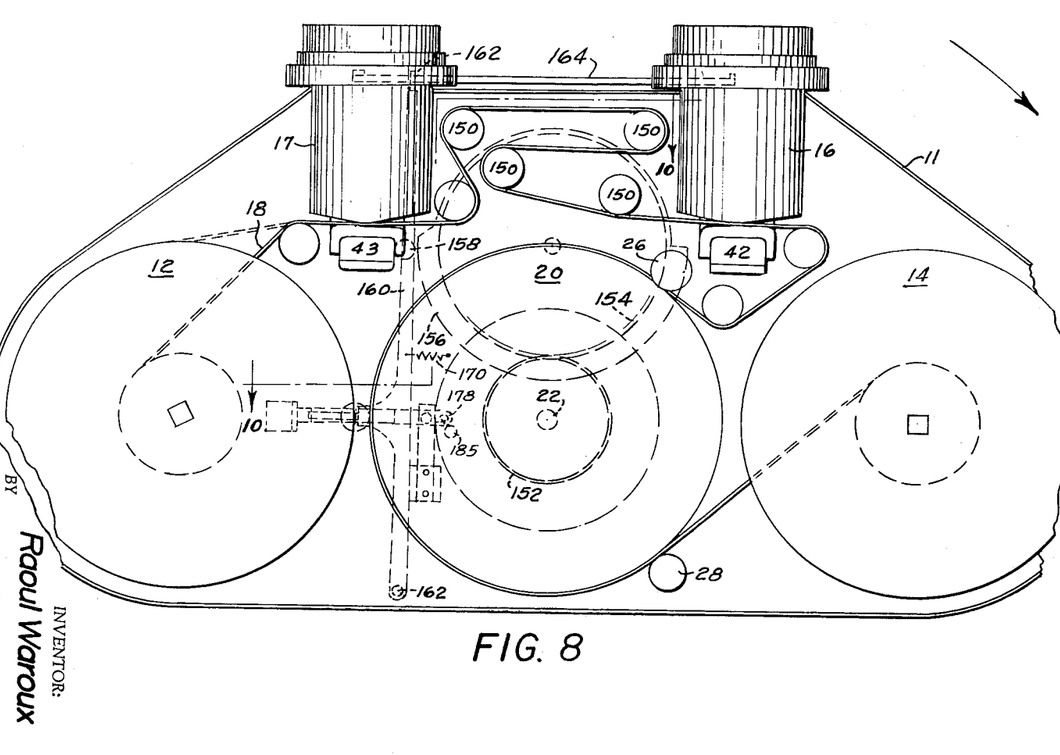
FIGURE 8 is a view similar to FIGURE 1, in horizontal section, of a form of the invention providing for the taking of stereoscopic pairs of panoramic pictures.

This variation of the invention is illustrated in FIGURES 8 to 11 of the drawings, and reference is first made to FIGURE 8, in which the same numerals have been employed for elements that are identical with those already mentioned. Thus, there are shown a taking lens 16 as before, and a second taking lens 17 which may be a duplicate thereof, the focal lengths being related to the diameter of the feeding cylinder or drum 20 as already described. Pressure pads 42 and 43 are provided at both exposure points, and of course duplicate slit constructions such as heretofore detailed. Numerals 26 and 28 again designate auxiliary rollers for maintaining the film taut about stationary drum 20, but their pressure springs, and other obvious parts, have been omitted from this view. Matters are arranged so that, prior to commencement of each exposure, fresh unexposed film has been wound from supply reel 12 in amount sufficient to fill the storage reservoir defined by a plurality of rollers 150 mounted between the two lenses. For pictures of maximum length, say about 25 cm. each, the rollers define a serpentine path of that length as shown in full lines about the rollers 150. At the start of an exposure, both lenses are opened and as casing 11 rotates, the film is caused to feed onto take-up reel 14 as already described, each lens continously exposing the slit images corresponding to the spaced stereo viewpoints. Lens 17 exposes film being drawn from reel 12, while lens 16 exposes the fresh film wound about rollers 150.

As the exposures continue, the film exposed by lens 17 passes about rollers 150 and hence into the "reservoir," while that exposed by lens 16 is drawn about drum 20 and ultimately passes to the take-up reel 14. At the finish of one turn of the camera motion, for a 25 cm. picture length, the film now in the reservoir has all been exposed, by lens 17, so it is necessary to provide sufficient additional film feed to draw all of this exposed film also past lens 16, but with both lenses closed, before the next exposure cycle can commence. To this end, provision is made for a second and idle rotation of casing 11 in the same direction, but with automatic provision for the capping of both lenses. In the case of pictures desired to be shorter than a full turn, or shorter than about 25 cm. in our example, the idle rotation will follow a group of shorter pictures totalling 360 degrees through each lens, in this particular form of the invention.

Figure 9:
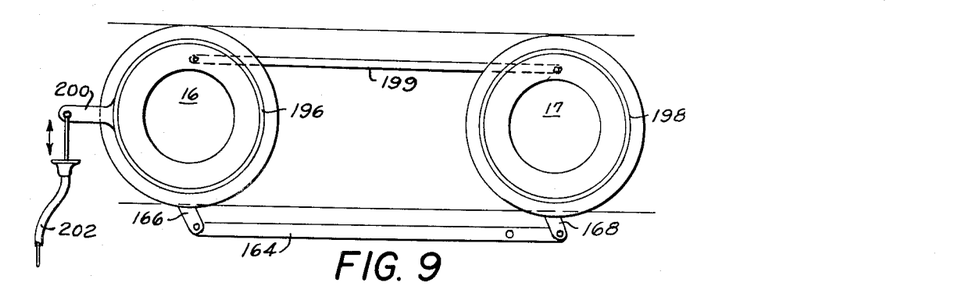
FIGURE 9 is a front view or elevation of the camera of FIGURE 8, illustrating the coupled cover-blind controlling arrangement for cutting off the rays of both lenses during a film-replenishment phase of the stereo cycle; and illustrating a coupled diaphragm form of exposure-modulation.
Figure 10:
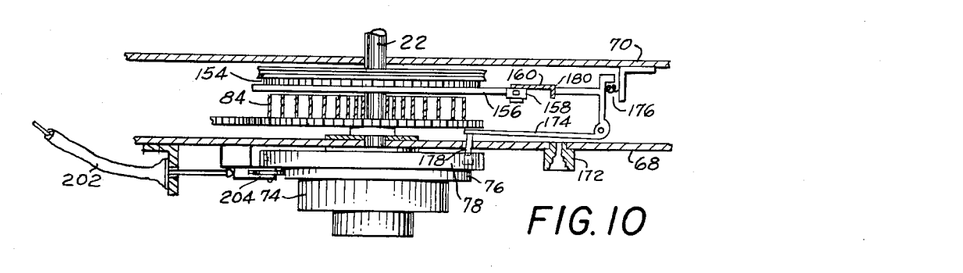
FIGURE 10 is a fragmentary vertical sectional view of parts of the drive and control mechanism of this form of camera, the view being taken along the line 10—10 of FIGURE 8.

Referring to FIGURES 8 and 10, fixed shaft 22 in this embodiment also carries a toothed gear 152 meashing with a second gear 154 having twice the diameter of gear 152, and the shaft of this second gear has affixed to it a cam 156 of which one half the periphery has a smaller radius than the other half, as clearly shown in FIGURE 8. Thus, during one (taking) rotation of casing 11, the part of cam 156 having the smaller radius positions a cam roller 158 on a long lever 160 (pivoted at 162 to the casing) to the right of the position as seen in FIGURE 8. Lever 160 thus also lies to the right, in which position its forward end 162 positions a bar 164 (see FIGURE 9) so that simple capping shutters 166 and 168 (see FIGURE 9) for the respective lenses are opened. At the end of one turn of the camera casing (during which the picture is taken) the cam 156 will have made a half turn and its larger radius portion will cause lever 160 to move to the left, as illustrated in FIGURE 8, against the tension of spring 170, closing the shutters during a second rotation of the camera casing.

The operating cycle can be followed from the schematic section of FIGURE 10, taken on line 10—10 of FIGURE 8. Assuming fresh film to be in position ready for exposure by each lens, a Bowden cable release connected to fitting 172 will lift lever 174 against the tension of spring 176, disengaging pin 178 from clamp plate 78 and allowing the camera to rotate under the torque of spring motor 84, pin 178 riding on plate 78 when the cable is released. The capping shutters will be open, and indeed are normally open when the camera is carried about, as only a very short length of film will thus be fogged, which short length will lie between the actual pictures. As the camera rotates, the two pictures will be taken progressively. The Bowden cable need not again be released after the complete "taking" turn, because as soon as the highest part of cam 156 engages roller 158 after the completion of the taking rotation (this position being shown in FIGURE 8), the lever 160 will be positioned as in FIGURE 10, its shoulder 180 holding lever 174 in the spring-releasing condition so that the necessary idle turn ensues. During the idle turn, the capping shutters will be closed and fresh film fed into the reservoir at rollers 150. The idle turn will be terminated when the low part of the cam arrives at roller 158, and of course at this point the pin 178 drops into the recess in the top of plate 78.

While the above description covers the operation for the taking of two stereo-paired views each of a full turn, or about 360 degrees, it will be obvious that several shorter views can equally well be made, by manually stopping the camera before the first full turn is completed, at one or more points, after each of which the camera is aimed at a new scene. When one full set of pictures totalling one camera turn has been taken in this way, the idle turn will ensue automatically as already described.

Figure 7:
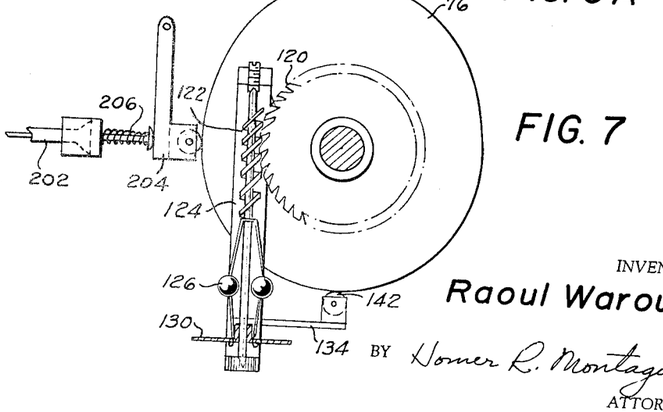
FIGURE 7 is a schematic plan view, looking in the direction of arrows 7—7 of FIGURE 6, illustrating the relationship of certain parts thereof.

FIGURES 7, 9 and 10 additionally illustrate a modification of the exposure regulating arrangements, in that instead of the control cam 76 operating on the camera film speed, it operates on adjustable lens diaphragms of known kind. In FIGURE 9, lenses 16 and 17 have the usual iris diaphragms having control rings 196 and 198, connected at 199, and one of these rings has also an operating finger 200 connected to the control wire of a Bowden cable 202. The Bowden cable terminates (in FIGURE 10) with its operating headpiece in contact with a roller arm follower 204 contacting the periphery of cam 76, being urged against the cam by a spring 206. In this way, both diaphragms will be opened and closed in synchronism as the camera rotates, and to the extent required by the cam configuration, or by the other exposure-modulating control if provided as suggested above.

Figure 11:
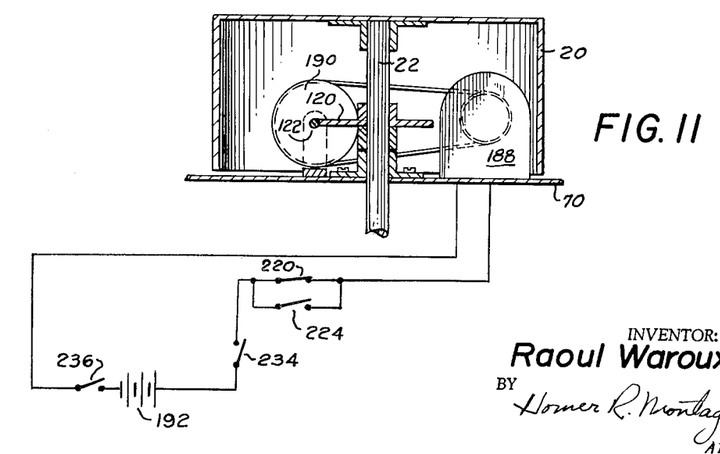
FIGURE 11 is a schematic view illustrating one form of disposition for an electric drive motor replacing the spring drive of the other forms illustrated.

The apparatus as described for stereo sets of pictures may however include the same arrangements for control of the exposure level as described in connection with the single-lens embodiment. FIGURE 11 of the drawings thus shows the film drum 20 of FIGURES 8 and 10 as enclosing the speed governor gear 120 fixed to shaft 22, the other speed control arrangements being precisely as heretofore described. However, FIGURE 11 also illustrates a modification of the camera drive in which an electric motor replaces the spring motor, this modification also being applicable either to the single-picture camera or to the stereo type. Electric motor 188 is mounted on plate 70 within drum 20 and is belted to a pulley 190 on the shaft 122 of the governor, the motor circuit being controlled by apparatus to be described below.

Figure 12:
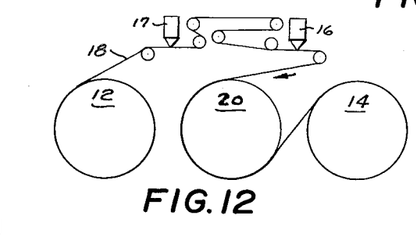
FIGURES 12 through 15 are schematic views showing the various stages in the film transport action of the stereo camera.
Figure 13:
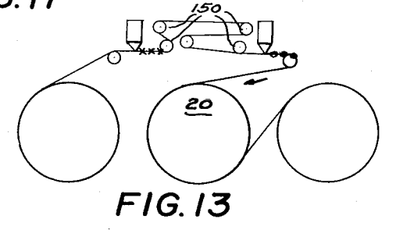
Figure 14:
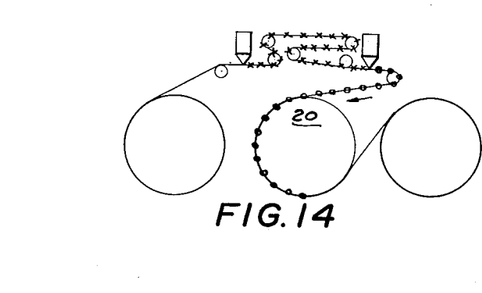
Figure 15:
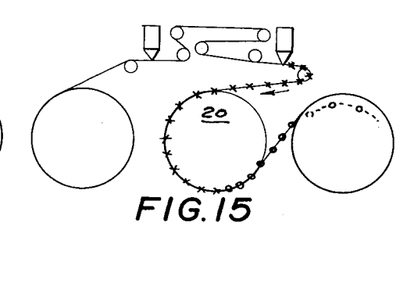

FIGURES 12 to 15 show various phases of the stereo panoramic film motion, for a clear understanding of the sequence. A plain line has been used to show the film path, and has been marked with small x's where it is exposed by lens 17, and small o's where exposed by lens 16. In FIGURE 12, fresh film has been treaded from the left hand reel through the camera and connected to the right hand reel, as shown. In FIGURE 13, just after exposure has commenced, a small length of film has been exposed by each lens, that exposed by lens 17 being ready to enter the reservoir provided by rollers 150. In FIGURE 14, two complete exposures have been made, the film exposed by lens 17 filling the reservoir, and that exposed by lens 16 being partly wrapped about drum 20. The capping shutters are now closed, and a second complete camera rotation is made, so that all of the film in the reservoir is drawn past lens 16 without further exposure, leaving the camera ready for a new sequence of pictures.

Figures 16, 17:
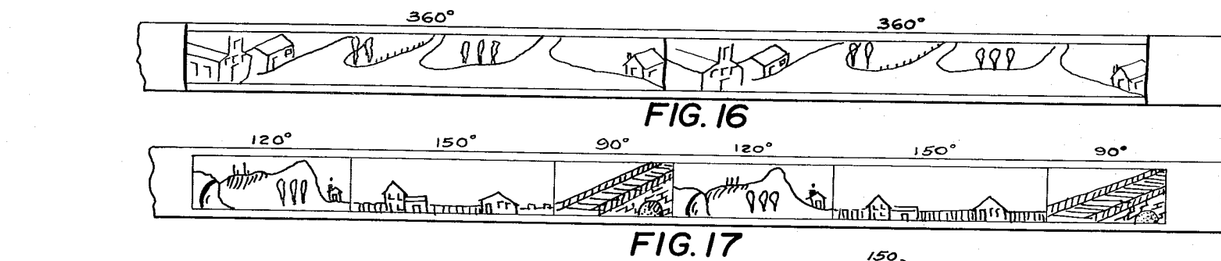
FIGURE 16 is view similar to FIGURE 5 but of a developed film strip carrying stereoscopic image pairs thereon.
FIGURE 17 is a view similar to FIGURE 16, showing a film strip made up of several partial-turn panoramic stereo views.

FIGURE 16 illustrates a typical exposed and processed film made by the stereo panoramic camera, with successive 360 degree left and right eye views which can be viewed by a suitable viewer. Such a viewer will expose corresponding portions of the two pictures of each pair, with the proper center-to-center distance between those portions.

FIGURE 17 shows, in corresponding alignment with FIGURE 16, the kind of film strip that would be produced if the camera were stopped during the taking operation at the 120 and 270 degree positions, and aimed at a different subject, then restarted. The left and right lens views still correspond as to each individual scene, but the total 360 degrees motion of the camera for the taking turn of the camera casing is shared by three different subjects.

Figure 18:
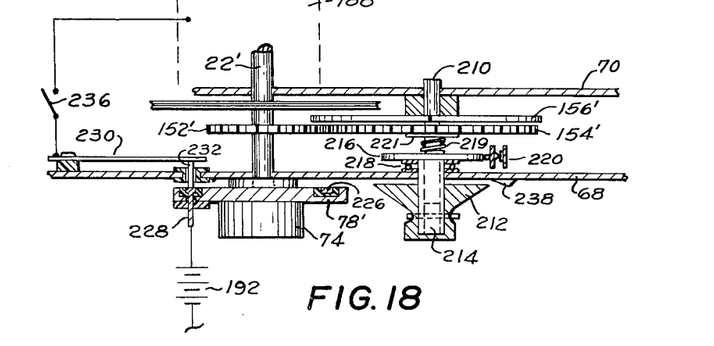
FIGURE 18 is a schematic view, partly in vertical section taken on line 18—18 of FIGURE 19, illustrating a modified electrical control system for a stereo panoramic camera arranged to take views of different length.
Figures 19, 20:
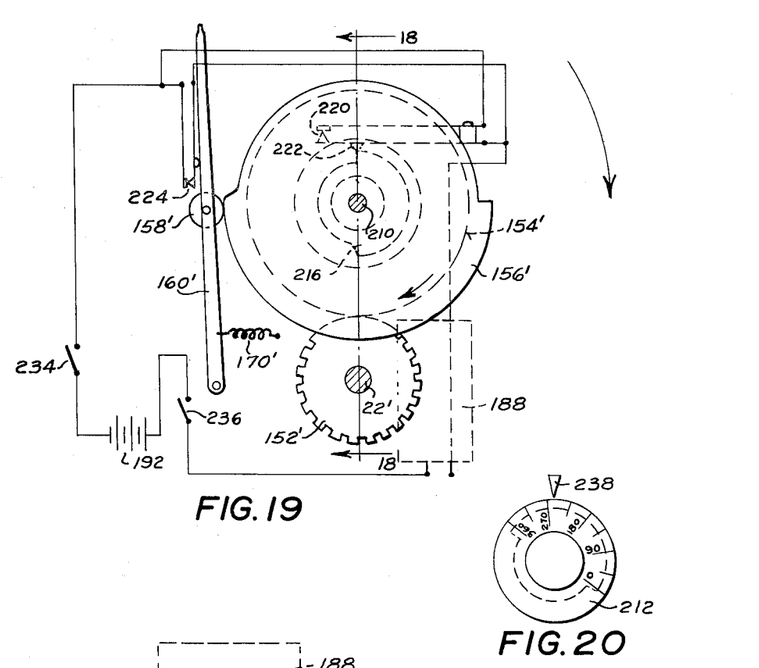
FIGURE 19 is a plan view of the same structure, including a schematic wiring diagram thereof.
FIGURE 20 is a face view of the control knob of FIGURE 18.

Reverting now to the control arrangements for an electric motor drive for such a camera, it has already been described in connection with FIGURE 11 how tthe electric motor 188 may be positioned and connected to drive the casing about the fixed shaft 22' using a governor as before, but now merely for good speed regulation in view of the battery operation of the motor, as desired for portable operation. Turning to FIGURES 18, 19 and 20, the description of this electric motor arrangement will be continued, using for comparable parts the same reference numerals but with a prime mark, as follows.

Motor 188 is belted to gear 152' fast on the fixed shaft 22', so that the casing will rotate about the shaft 22' by virtue of torque reaction, the same as in the case of a spring motor. Gear 152' is geared to gear 154' of double its size, to effect a two-to-one reduction in the rotation speed of gear 154' and hence of the cam 156' secured therewith on stub shaft 210, which extends through the camera bottom plate 68. A manual setting knob 212 is fixed on a hollow shaft 214 which fits loosely about shaft 210, and at its inner end has secured to it a second cam 216. A ball bearing 218 is placed between cam 216 and the inner surface of bottom wall 68, and a spring 219 encircling shaft 214 urges the knob away from that wall, but allows the knob to be rotated manually for a purpose to be described. The spring 219 and a friction washer 221 on gear 154' cause cam 216 and knob 212 to partake of the rotation of cam 154'.

An electrical contact 220, formed by a pair of spring blades, suitably insulated from the camera frame, is closed under control of cam 216 when the high portion of the latter, amounting to about 180 degrees of its circumference, contacts an insulated post 222 on one spring blade. The capping shutter operating lever 160' is pivoted on the casing as before, and is urged to the right in FIGURE 19 by spring 170'. Lever 160' operates a second pair of contact blades to open and close contacts 224 when the cam roller 158' lies on the high part of cam 156'.

Since the camera support or tripod mount at 74 will again be stationary while the camera casing rotates about its axle, it is desirable to prevent the conductors from the external battery 192 from wrapping about the tripod. To this end, the camera frame (of metal) is employed as a ground return for one side of the motor-battery circuit, and the other conductor 228 leads to a slip ring 226 insulatively mounted on the fixed plate 78'. A spring contact blade 230 also insulatively mounted on wall 68 of the camera casing urges its contact pin or brush 232 through a bushing in this wall and into contact with the slip ring 226, and the other motor terminal is connected to this blade 230.

Besides an on-off switch 234 normally at the battery itself, carried externally of the camera or hung on the tripod, a safety on-off switch 236 may be carried on the camera itself, to prevent accidental release of the motor during transportation of the camera. Knob 212 has half its periphery graduated in angles from zero to 360 degrees, as shown in FIGURE 20, which also indicates a fiducial mark 238 on the casing wall.

To understand the operation, refer to FIGURE 19, and noting that contacts 224 and 220 are in parallel, it will be realized that (assuming that switches 234 and 236 are closed by the operator), the motor 188 will be energized for an ensuing half turn of cam 156' in the direction of the arrow thereon, corresponding to one full turn of the camera casing due to the two-to-one reduction gearing between cam 156' and shaft 22'. Hence, FIGURE 19 shows the commencement of the idle full turn following completion of a total of 360 degrees of taking. When this idle turn has been completed, cam 156' will have rotated 180 degrees and contacts 224 will open. Also, contacts since contacts 220 will then be open, the motor will stop and the apparatus is ready for a subsequent taking rotation. Ordinarily, one or the other (or both) of switches 234 and 236 will be then opened by the user.

To initiate a further taking operation, the user moves knob 212 to indicate the desired angular extent of the next photograph—let us say 120 degrees. This advances cam 216 an angle of 60 degrees (remembering that the scale on knob 212 occupies only half its periphery), and closes contacts 220. When the user closes switches 234 and 236, or whichever one was open, the motor commences to run, and runs until contacts 220 are opened by cam 216. The user may then set knob 212 to call for a further picture or pictures, equal to or more than one full turn of the camera. When a full turn of the camera has been completed, measured from the original starting position, cam 156' will arrive at the position shown in FIGURE 19, and will close contacts 234 to cause the motor to be energized for a full idle turn as required to replenish the film in the reservoir as already described. At the same time, the operation of arm 160' to the position shown has closed the capping shutters so that the blank film will not be fogged, also as described herein.

When the idle turn has been completed, the roller 158' falls onto the smaller radius of cam 156', contacts 224 open to stop the apparatus, and the capping shutters open; following which repeated operations of the same kind can be carried out.

While the invention has been described herein in considerable detail, so that those skilled in this art may practice the same, it is to be understood that such details are not intended to limit the scope of the invention except as may be required by the appended claims.

What is claimed is:

1. A stereo panoramic camera comprising a casing, a fixed support upon which said casing is journalled for rotation, power means for rotating said casing to direct the camera successively in different azimuths, a film wrap drum in said casing, and film strip supply and take-up reels in said casing and outside of said drum, the impovement which comprises a pair of spaced lenses for exposing spaced areas of film fed about said drum to the scenic rays transmitted by the respective lenses, and means defining a film reservoir between said lenses to receive film exposed through one of said lenses, in an amount greatly in excess of the physical separation of said lenses.

2. A stereo panoramic camera in accordance with claim 1, in which the means defining said reservoir comprises a plurality of spaced film-receiving rollers arranged to define a film path of serpentine configuration.

3. A panoramic stereo film strip camera including a pair of lenses, a casing, means for rotating said casing together with said lenses to expose individual lengthwise portions of a film strip progressively to slit images from spaced viewpoints of a scene being photographed, power means for rotating said casing through a predetermined angle corresponding to twice the length on said film of each of the complete images produced by said lenses, and means operable automatically upon rotation of said casing through one-half of said angle for capping said lenses during the remainder of such rotation, to avoid undesired exposure of film sections traveling past the lenses toward positions required to be reached for a subsequent set of exposures.

4. In a stereo panoramic camera including strip film feeding means and separate lens systems for progressively exposing spaced portions of a film strip to stereo panoramic views, means responsive to the extent of film feed for capping said lens systems upon completion of the feeding of an extent of the strip corresponding to the space between said portions to provide adjacent non-overlapping stereo views on said strip, means responsive to said last-named means for initiating a further film feeding operation to draw unexposed film past one of said lens systems in perparation for the taking of subsequent views, and means responsive to the said further feeding of an amount of film corresponding to the space between said portions for terminating film feed and opening said capping means.

5. A stereo panoramic camera in accordance with claim 4, in which said strip film feeding means is an electric motor, and in which both of said responsive means are constituted by contacts in the control circuit of said motor, and cam means operated by said motor for operating said contacts.

6. A stereo panoramic camera in accordance with claim 4, and manually settable means for selectively interrupting the feeding of such film at a selected point in advance of the operation of said first responsive means.

7. A stereo panoramic camera in accordance with claim 6, in which said manually settable means includes a control knob operably connected with a contact-controlling cam, and in which the film feeding means includes an electric motor controlled by said cam.

8. In a stereo camera including strip film feeding means and lens means for progressively exposing spaced portions of a film strip to stereo panoramic views, means responsive to the extent of film feed for capping said lens means upon completion of a certain predetermined extent of the strip, and means responsive to said last-named means for initiating a further film feeding operation to draw unexposed film into position for the taking of subsequent views.

References Cited by the Examiner

UNITED STATES PATENTS

| | | | |
|---|---|---|---|
| 2,778,289 | 1/1957 | Stellpflug | 95—18 |
| 2,941,458 | 6/1960 | Crockwell | 95—15 |

JOHN M. HORAN, *Primary Examiner.*